Nov. 10, 1959 J. VARRONE 2,912,129
DEVICE FOR LOADING AND UNLOADING CARGO ON TRAILERS AND TRUCKS
Filed June 16, 1958 3 Sheets-Sheet 1
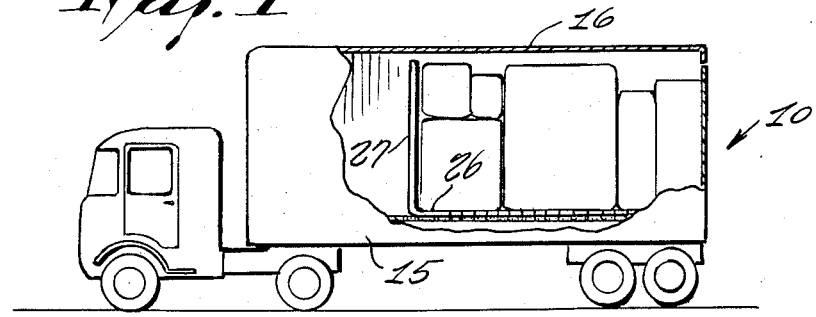
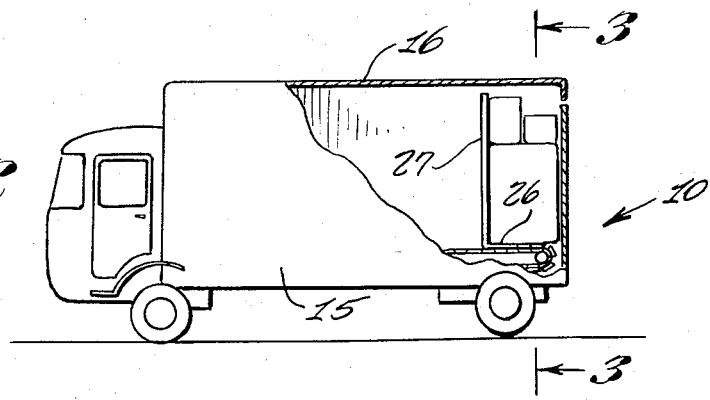
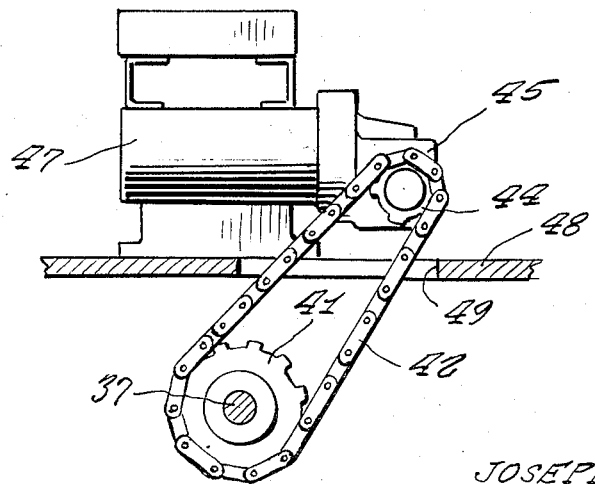
INVENTOR.
JOSEPH VARRONE
BY
Carl Miller
ATTORNEY

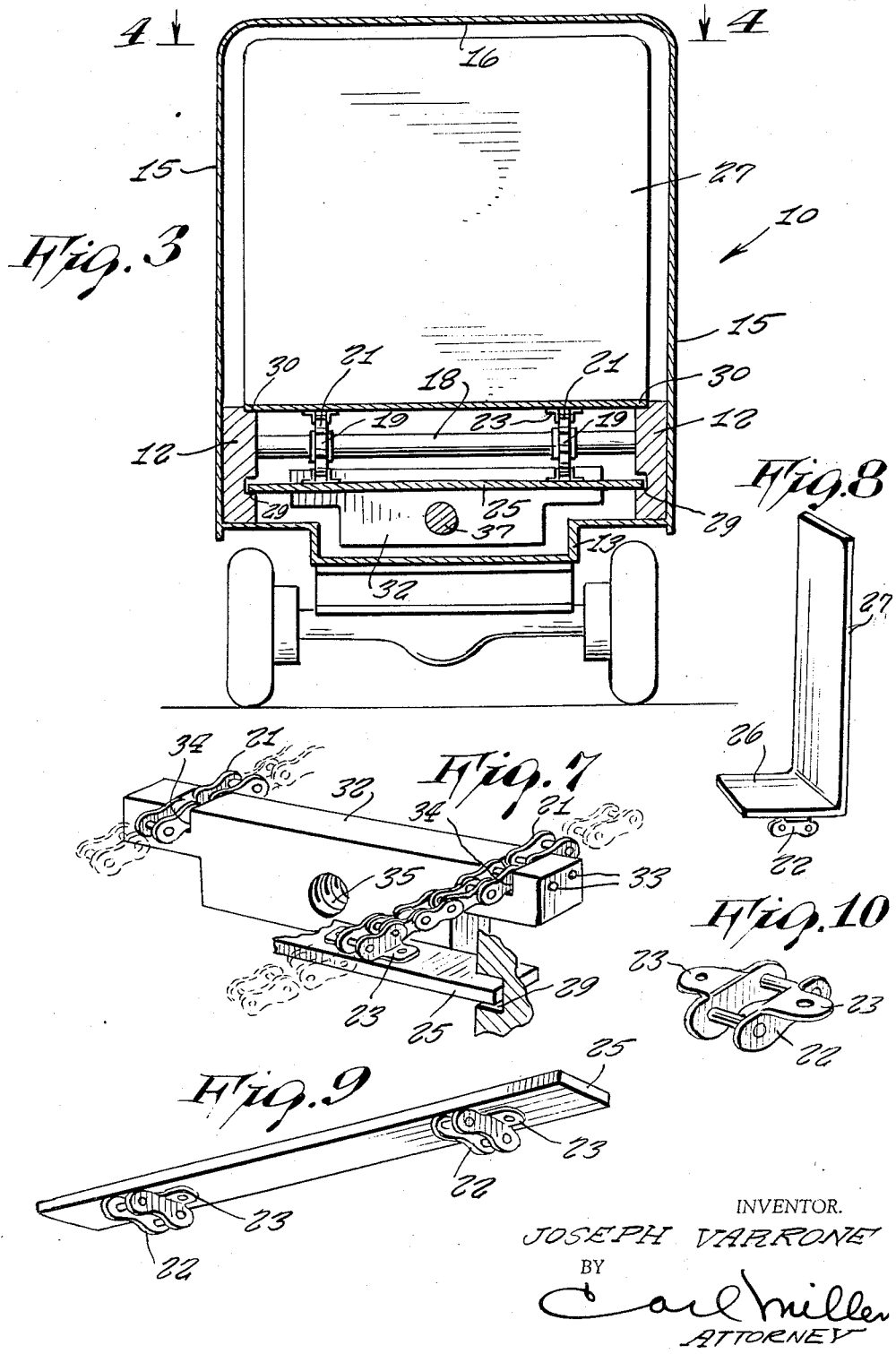

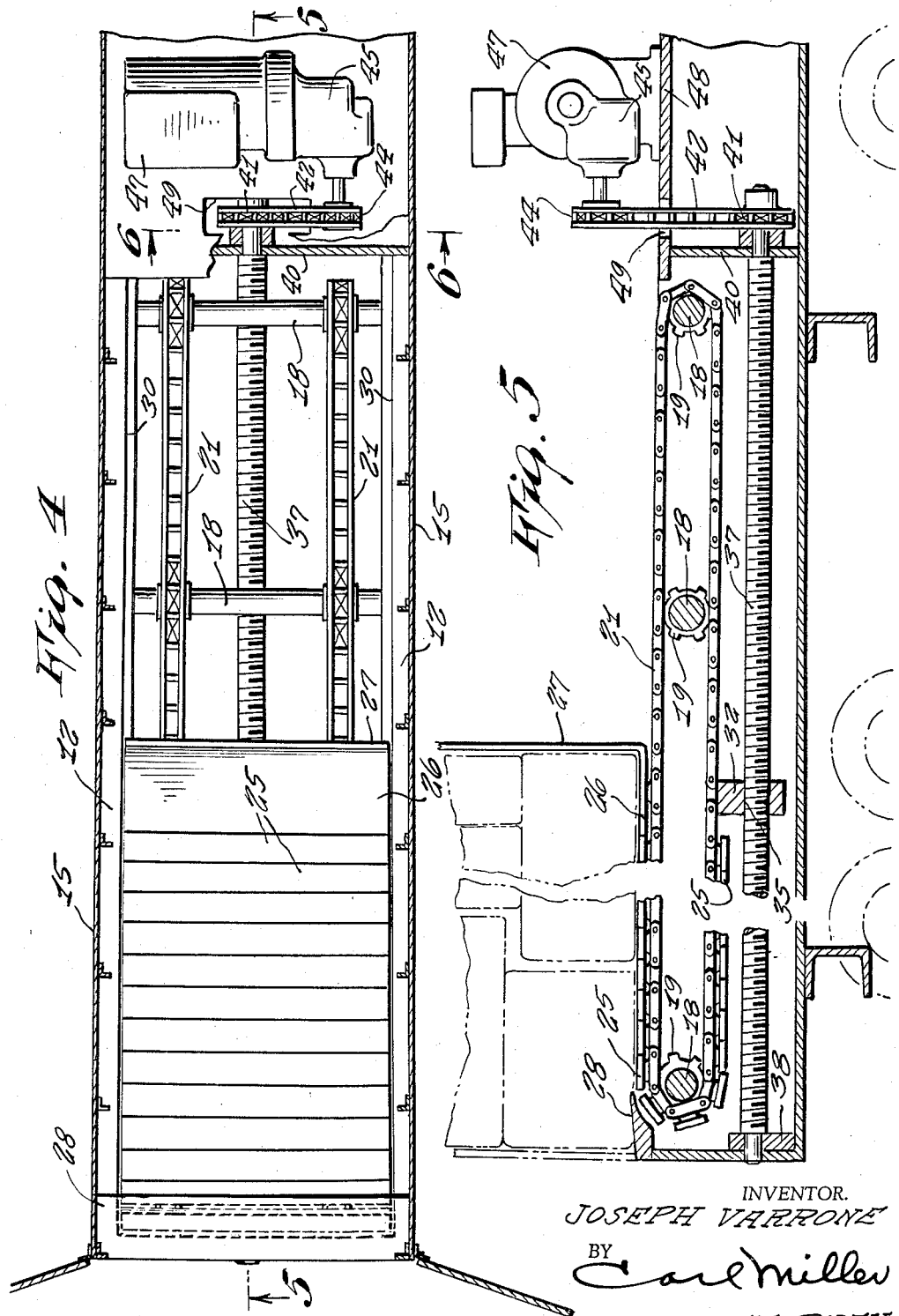

2,912,129

DEVICE FOR LOADING AND UNLOADING CARGO ON TRAILERS AND TRUCKS

Joseph Varrone, Brooklyn, N.Y.

Application June 16, 1958, Serial No. 742,206

2 Claims. (Cl. 214—82)

This invention relates to transport vehicles and more particularly to a loading device therefor.

Ordinarily, it is necessary for workmen to carry the cargo throughout the entire length of the trailer or truck vehicle in order to load or unload properly. This is not only time consuming, but also is quite difficult especially when the cargo is very heavy or difficult to manipulate. It is therefore an object of the present invention to provide a self-contained loading mechanism for trailers and trucks that will enable all cargo to be loaded and unloaded directly from the open end of the vehicle without having to carry it throughout the entire length thereof.

Another object of the present invention is to provide a self-contained loading device of this type that is extremely simple in construction, efficient in operation, and which will overcome the aforementioned difficulty.

Still a further object of the present invention is to provide a loading and unloading device for vehicles in the form of a conveyor system along the floor level of the vehicle that will carry the cargo from one end to the other, and which is actuated by a separate power plant especially mounted for this purpose.

All of the foregoing and still further objects and advantages of this invention will become apparent from a study of the following specification, taken in connection with the accompanying drawing, wherein:

Figure 1 is a side elevational view, with parts broken away, of a vehicle embodying a loading and unloading device made in accordance with the present invention;

Figure 2 is a view similar to Figure 1, showing the loading mechanism in an adjusted position;

Figure 3 is an enlarged transverse cross sectional view taken along line 3—3 of Figure 2;

Figure 4 is a longitudinal cross sectional view taken along line 4—4 of Figure 3;

Figure 5 is a transverse cross sectional view taken along line 5—5 of Figure 4;

Figure 6 is an enlarged fragmentary transverse cross sectional view taken along line 6—6 of Figure 4;

Figure 7 is a fragmentary perspective view of certain parts of the operating mechanism;

Figure 8 is a perspective view of a bulkhead forming a part of the present invention;

Figure 9 is a perspective view of a floor slat forming another part of the present invention; and Figure 10 is a perspective view of a chain link forming still another part of the present invention.

Referring now to the drawing, and more particularly to Figures 1 to 3 thereof, a vehicle 10 embodying a loading and unloading system made in accordance with the present invention is shown to include a pair of longitudinal side rails 12 disposed above the subflooring 13 and within the side walls 15. The roof 16 is connected to the side walls 15 and defines a longitudinal compartment therewithin for receiving and storing cargo in a conventional manner.

A plurality of longitudinally spaced apart and transversely extending shafts 18 are rotatably supported upon the side sills or side rails 12, each of which is provided with a pair of spaced apart sprocket wheels 19 that are in meshing engagement with the upper and lower runs of a pair of endless chains 21. As is more clearly shown in Figures 7 and 10, each chain 21 is constructed from links 22 that have laterally outwardly extending webs 23 which facilitate the fastening of transversely extending floor plates 25 thereto. The base 26 of a bulkhead 27 is secured to the upper run of both chains 21, while a crosshead 32 is secured to the lower runs of the chains 21. The rib plates 25 are secured in juxtaposed relationship upon the chains 21 intermediate the bulkhead and crosshead, adjacent to the rear end of the vehicle. Thus, when the bulkhead 27 is in the one extreme position away from the open end of the vehicle, the plates 25 form a continuous floor. A threshold plate 28 covers over the terminal portion of the conveyor system so as to prevent articles from falling between the plates 25 as they move upwardly and downwardly around the sprocket wheel 19. This threshold plate also prevents accidental injury to the workmen.

With more specific reference now to Figure 3 of the drawing, it will be noted that the side sills 12 define longitudinal grooves 29 for slidably supporting the lower run of the floor plates 25, while upwardly opening recesses 30 guide and vertically support the upper run of floor plates during the reciprocating longitudinal movement thereof. In this manner, the entire weight of the floor plates is structurally supported upon the side sills 12 of the vehicle so that they do not sag or move out of alignment with each other during use.

As is shown in Figure 7 of the drawing, pins 33 secure the chains 21 within laterally spaced apart recesses 34 in the upper surface of the crosshead 32. This crosshead is also provided with an internally threaded bore 35 that threadedly receives an externally threaded shaft 37 which runs through the entire length of the vehicle. One end of the shaft 37 is rotatably supported upon a bearing plate 38, while the opposite end thereof is rotatably supported within another plate 40. A sprocket wheel 41 is secured to the end of the shaft supported in a plate 40, which sprocket wheel is driven by means of a chain 42 from a similar sprocket 44 carried upon the output shaft of a speed reduction unit 45. Any desired type of motor 47 may be used to supply the power for operating the speed reduction unit 45, such as an electrical or gasoline driven unit that is independent of the main power plant of the vehicle. This motor 47 is supported upon the floor 48 of the vehicle removed from the conveyor floor formed by the plates 25, such floor 48 also having an opening 49 for allowing the passage of the sprocket chain 42 therethrough for connection to the drive sprockets 44, 41.

In actual use, the reversible motor 47 is energized to effect rotation of the shaft 37 in a direction that will move the bulkhead 27 toward the open end of the vehicle. As the cargo is placed upon the floor formed by the slats 25 and the bulkhead 27, the motor is energized in a reverse direction so as to slowly move the bulkhead toward the opposite end of the vehicle. Such movement can either be continuous or intermittent, depending upon the type of loading operation, and in any event it is only necessary for the workman to stand at the open end of the vehicle while loading the cargo. Finally, the bulkhead 27 will have been moved to its innermost position, with the entire vehicle loaded with cargo. When unloading the vehicle, the reverse action takes place, wherein the motor 47 is energized to move the bulkhead 27 toward the open end of the vehicle as the cargo is withdrawn.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A self loading cargo vehicle comprising, in combination, a rigid underframe, bearing means supporting said underframe upon a wheel and axle assembly, a body including side walls and a roof supported upon said underframe and defining a cargo receiving enclosure, conveyor means within said body for selectively moving cargo between the opposite ends of said vehicle body, said conveyor means comprising a pair of endless chains, sprocket wheels supporting said endless chains for movement between opposite ends of said body, a plurality of slats secured to said endless chains in juxtaposed relationship transversely of said body defining a floor portion for reciprocating longitudinal movement in response to movement of said endless chains, said endless chains including an upper run at substantially the floor level of said body, a lower run extending below the floor level of said body, a bulkhead secured to said upper run for reciprocating longitudinal movement between the opposite ends of said body with said chains, a cross head secured to said lower run of said chains, screw drive means effecting reciprocating longitudinal movement of said cross head, longitudinal movement of said cross head in one direction effecting longitudinal movement of said bulkhead and said floor portion in an opposite direction, said screw drive means comprising a longitudinal threaded shaft rotatably supported at opposite ends upon opposite ends of said body beneath said lower runs of said chains, said cross head threadedly receiving said shaft, and power means selectively rotating said shaft in opposite directions to effect longitudinal movement of said cross head and bulkhead in said opposite directions.

2. A self loading cargo vehicle as set forth in claim 1, further comprising longitudinal guide means integral with said underframe slidably supporting said slats carried by said upper and lower runs of said chains.

References Cited in the file of this patent

UNITED STATES PATENTS

| 1,320,782 | Mott | Nov. 4, 1919 |
| 2,030,685 | Curtis | Feb. 11, 1939 |
| 2,207,792 | Feucht | July 16, 1940 |
| 2,512,339 | Knapp | June 20, 1950 |
| 2,840,347 | Feucht | June 24, 1958 |